United States Patent

Yamamoto et al.

[11] Patent Number: 6,084,334
[45] Date of Patent: Jul. 4, 2000

[54] DRIVING APPARATUS FOR DRIVING PLURALITY OF VIBRATION TYPE MOTORS

[75] Inventors: Shinji Yamamoto; Kenichi Kataoka; Tadashi Hayashi; Jun Ito, all of Yokohama, Japan

[73] Assignee: Canon Kabushiki Kaisha, Tokyo, Japan

[21] Appl. No.: 09/179,595

[22] Filed: Oct. 27, 1998

[30] Foreign Application Priority Data

Oct. 29, 1997 [JP] Japan .................................. 9-297378

[51] Int. Cl.⁷ ...................................................... H02N 2/00
[52] U.S. Cl. ...................................................... 310/316.01
[58] Field of Search ........................................ 310/316.01

[56] References Cited

U.S. PATENT DOCUMENTS

| | | | |
|---|---|---|---|
| 3,447,051 | 5/1969 | Attwood et al. | 310/316.01 |
| 3,975,650 | 8/1976 | Payne | 310/316.01 |
| 4,698,541 | 10/1987 | Bar-Cohen | 310/326 |
| 4,748,365 | 5/1988 | Poupaert et al. | 310/316.01 |
| 5,001,404 | 3/1991 | Kataoka | 318/116 |
| 5,004,964 | 4/1991 | Kataoka | 318/128 |
| 5,157,300 | 10/1992 | Kataoka | 310/323 |
| 5,281,899 | 1/1994 | Culp | 318/116 |
| 5,285,134 | 2/1994 | Kataoka | 318/116 |
| 5,436,521 | 7/1995 | Kataoka | 310/317 |
| 5,459,370 | 10/1995 | Kataoka | 310/317 |
| 5,539,268 | 7/1996 | Kataoka | 310/316 |
| 5,631,516 | 5/1997 | Kataoka | 310/316 |
| 5,889,350 | 3/1999 | Yamamoto | 310/316 |

FOREIGN PATENT DOCUMENTS

| | | | |
|---|---|---|---|
| 0 359 409 | 3/1990 | European Pat. Off. | G01L 23/22 |
| 0 366 161 | 5/1990 | European Pat. Off. | G10K 11/00 |
| 0 425 697 | 5/1991 | European Pat. Off. | H04R 17/00 |
| 59-156168 | 9/1984 | Japan | H02N 11/00 |
| 63-209481 | 8/1988 | Japan | H02N 2/00 |
| 4-251581 | 9/1992 | Japan | H02N 2/00 |
| 8-95327 | 4/1996 | Japan | G03G 15/00 |

OTHER PUBLICATIONS

Patent Abstracts of Japan, vol. 10, No. 209 (E–421) [2265], Jul. 22, 1986 & JP–A–61–48300 (Olympus Optical Co.), Mar. 8, 1986.

Patent Abstracts of Japan, vol. 10, No. 209 (E–421) [2265], Jul. 22, 1986 & JP–A–61–48299 (Olympus Optical Co.), Mar. 8, 1986.

*Primary Examiner*—Thomas M. Dougherty
*Attorney, Agent, or Firm*—Fitzpatrick, Cella, Harper & Scinto

[57] ABSTRACT

This invention relates to an apparatus for simultaneously driving a plurality of vibration type motors. The frequency of a cyclic signal at which the motors exhibit the same speed is detected from the driving characteristics obtained upon application of the cyclic signal to each motor. When the motors are simultaneously driven, a cyclic signal having the detected frequency for each motor is applied to each motor to make the speeds of the motors equal to each other.

34 Claims, 11 Drawing Sheets

FIG. 10

| VARIABLE | SPEED [1/sec] |
|----------|---------------|
| V1  | 0.03 |
| V2  | 0.06 |
| V3  | 0.09 |
| V4  | 0.12 |
| V5  | 0.15 |
| V6  | 0.18 |
| V7  | 0.21 |
| V8  | 0.24 |
| V9  | 0.27 |
| V10 | 0.3  |

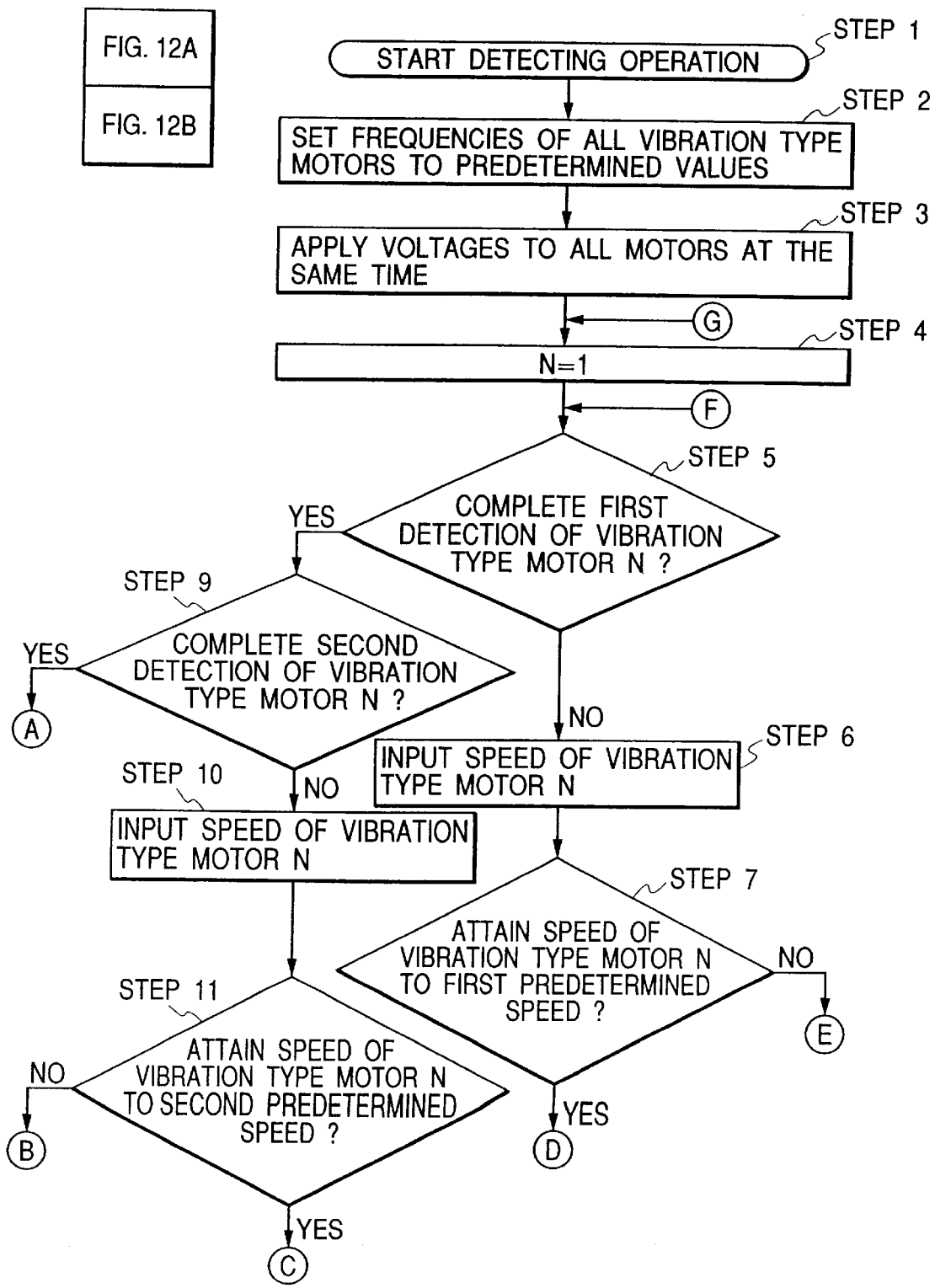

DRIVING APPARATUS FOR DRIVING PLURALITY OF VIBRATION TYPE MOTORS

BACKGROUND OF THE INVENTION

1. Field of the Invention

The present invention relates to an actuator driving method, a driving apparatus, and an image forming apparatus.

2. Related Background Art

There are many apparatuses which must drive a plurality of driving objects while synchronizing their driving speeds and the like.

For example, in an electrophotography type image forming apparatus, a motor for driving a photosensitive drum as an image carrier and a motor for conveying a copying paper sheet as a transfer member to the transfer position of the photosensitive drum must be driven in synchronism with each other anytime, e.g., during image transfer, at the start of driving, and at the end of driving.

This is because the photosensitive drum and the transfer member are in contact with or very close to each other, and if their speeds are different, the surface of the photosensitive drum is damaged by friction.

In view of the foregoing, actuators, as drives respectively for driving the photosensitive drum and conveying the transfer member, are controlled in synchronism with each other.

Recently, to improve the image quality of the image forming apparatus, several proposals have been made to increase the rotational precisions of the photosensitive drum and transfer member.

For example, in Japanese Patent Application Laid-open No. 8-95327, the image quality is improved by using a known vibration type motor to drive the photosensitive drum. The vibration type motor transfers vibration energy to a member to be rotated by friction and obtains a driving force. The vibration type motor suffers little play of the shaft due to its structure and generates a large torque during low-speed rotation. This proposal exploits these features to directly connect the photosensitive drum to the shaft of the vibration type motor to drive the drum, thereby reducing rotational variations of the drum and improving the image quality.

A vibration type motor called a resonance type motor generates energy by exciting a vibrator as one building component of the motor around its natural frequency.

The output torque or driving speed of the motor changes depending on the frequency (the number of pulses or the like) of an alternating signal supplied to a piezoelectric element as an electro-mechanical energy conversion element constructing the vibrator.

FIG. 7 shows changes in driving speed of the vibration type motor upon changing the frequency of the driving AC voltage of the vibration motor. In FIG. 7, fr represents the resonance frequency of the vibrator as a building element of the vibration type motor. The vibration type motor exhibits highest speed upon application of an AC voltage having the resonance frequency. The speed vs. frequency curve has different gradients in frequency regions above and below the resonance frequency. In terms of controllability, the vibration type motor is generally better controlled in the frequency region higher than the resonance frequency.

Compared to a conventional electromagnetic motor, the vibration type motor suffers large characteristic variations.

For example, as shown in FIGS. 8A and 8B, the vibration type motor has an individual difference in frequency vs. speed characteristics. In FIG. 8A, motors A and B have different resonance frequencies and different speeds even upon application of the same frequency. In FIG. 8B, motors A and C have the same resonance frequency but different gradients of speed vs. frequency curves upon application of the resonance frequency. Owing to these characteristic differences, the speed varies between members connected to a plurality of motors upon application of a specific frequency when the vibration type motor is activated.

Particularly when the vibration type motor is applied to the above-mentioned image forming apparatus, the surface of the photosensitive member may be damaged by friction.

To detect any individual difference of the vibration type motor and operate the motor in accordance with its individual difference, the frequency for driving is swept in advance, characteristics such as the relationship between the frequency for driving and the speed are detected, and then the motor is driven, as disclosed in Japanese Patent Application Laid-open Nos. 59-156168, 63-209481, and 4-251581.

However, when vibration type actuators are used as drivers for the photosensitive drum and the transfer member convey unit, and each motor's characteristics are detected, since the actuators are not synchronized during characteristic detection, a speed difference is produced at the contact portion between the photosensitive drum and the transfer member to damage the surface of the photosensitive drum.

SUMMARY OF THE INVENTION

One object of the invention is to provide an actuator driving apparatus capable of easily synchronizing a plurality of actuators and driving them.

Another object of the invention is to provide a driving apparatus capable of easily synchronizing a plurality of actuators and driving them.

Yet another object of the invention is to provide an image forming apparatus capable of driving a plurality of image carriers and a transfer member convey means in synchronism with each other.

Yet another object of the invention is to provide a driving apparatus for controlling speeds of a plurality of vibration type motors, including a detecting unit for applying a cyclic signal to each motor and detecting an output characteristic of the motor, and a control unit for adjusting the cyclic signal applied to each motor and controlling a speed of the motor on the basis of the output characteristic of the motor detected by the detecting unit.

Yet another object of the invention is to provide a driving apparatus which has at least first and second vibration type motors and drives moving members with the motors, including a memory unit for memorizing first driving data corresponding to speeds for changing a speed of the moving member driven by the first motor to a plurality of different speeds including first and second speeds, and second driving data corresponding to speeds for changing a speed of the moving member driven by the second motor to a plurality of different speeds including the first and second speeds, and a driving unit for controlling a driving signal with the first driving data in driving the first motor, and controlling the driving signal with the second driving data in driving the second motor.

Yet another object of the invention is to provide a driving apparatus which has at least first and second vibration type motors and drives moving members with the motors, including a driving circuit for driving the motors, and an adjustment unit for adjusting driving gains of the first and second motors by the driving circuit on the basis of driving characteristics of the first and second motors, respectively.

Yet another object of the invention is to provide a driving apparatus for controlling speeds of a plurality of vibration type motors, including a memory unit for memorizing cyclic signal vs. speed characteristic data for each motor, and a setting unit for setting the cyclic signal on the basis of data about each motor memorized in the memory unit so as to make speeds of moving members driven by the motors substantially equal to each other when the motors are simultaneously driven.

Yet another object of the invention is to provide a driving apparatus for controlling speeds of a plurality of vibration type motors, including a driving circuit for each motor, and a setting unit for setting a driving gain for each motor in the driving circuit of the motor on the basis of an output characteristic of the motor.

Yet another object of the invention is to provide an image forming apparatus for driving moving members with a plurality of vibration type motors and forming an image, including a detecting unit for applying a cyclic signal to each motor and detecting an output characteristic of the motor, and a control unit for adjusting the cyclic signal applied to each motor and controlling a speed of the motor on the basis of the output characteristic of the motor detected by the detecting unit.

Yet another object of the invention is to provide an image forming apparatus having a driving apparatus which has at least first and second vibration type motors and drives moving members with the motors, including a memory unit for memorizing first driving data corresponding to speeds for changing a speed of the moving member driven by the first motor to a plurality of different speeds including first and second speeds, and second driving data corresponding to speeds for changing a speed of the moving member driven by the second motor to a plurality of different speeds including the first and second speeds, and a driving unit for controlling a driving signal with the first driving data in driving the first motor, and controlling the driving signal with the second driving data in driving the second motor.

Yet another object of the invention is to provide an image forming apparatus having a driving apparatus which has at least first and second vibration type motors and drives moving members with the motors, including a driving circuit for driving the motors, and an adjustment unit for adjusting driving gains of the first and second motors by the driving circuit on the basis of driving characteristics of the first and second motors, respectively.

Yet another object of the invention is to provide an image forming apparatus having a driving apparatus for controlling speeds of a plurality of vibration type motors, including a memory unit for memorizing cyclic signal vs. speed characteristic data for each motor, and a setting unit for setting the cyclic signal on the basis of data about each motor memorized in the memory unit so as to make speeds of moving members driven by the motors substantially equal to each other when the motors are simultaneously driven.

Yet another object of the invention is to provide an image forming apparatus having a driving apparatus for controlling speeds of a plurality of vibration type motors, including a driving circuit for each motor, and a setting unit for setting a driving gain for each motor in the driving circuit of the motor on the basis of an output characteristic of the motor.

The above and other objects of the present invention will be apparent from the following embodiments in conjunction with the accompanying drawings.

BRIEF DESCRIPTION OF THE DRAWINGS

FIG. 10 is a speed table used in the second embodiment;

DESCRIPTION OF THE PREFERRED EMBODIMENTS

First Embodiment

Figure 2:
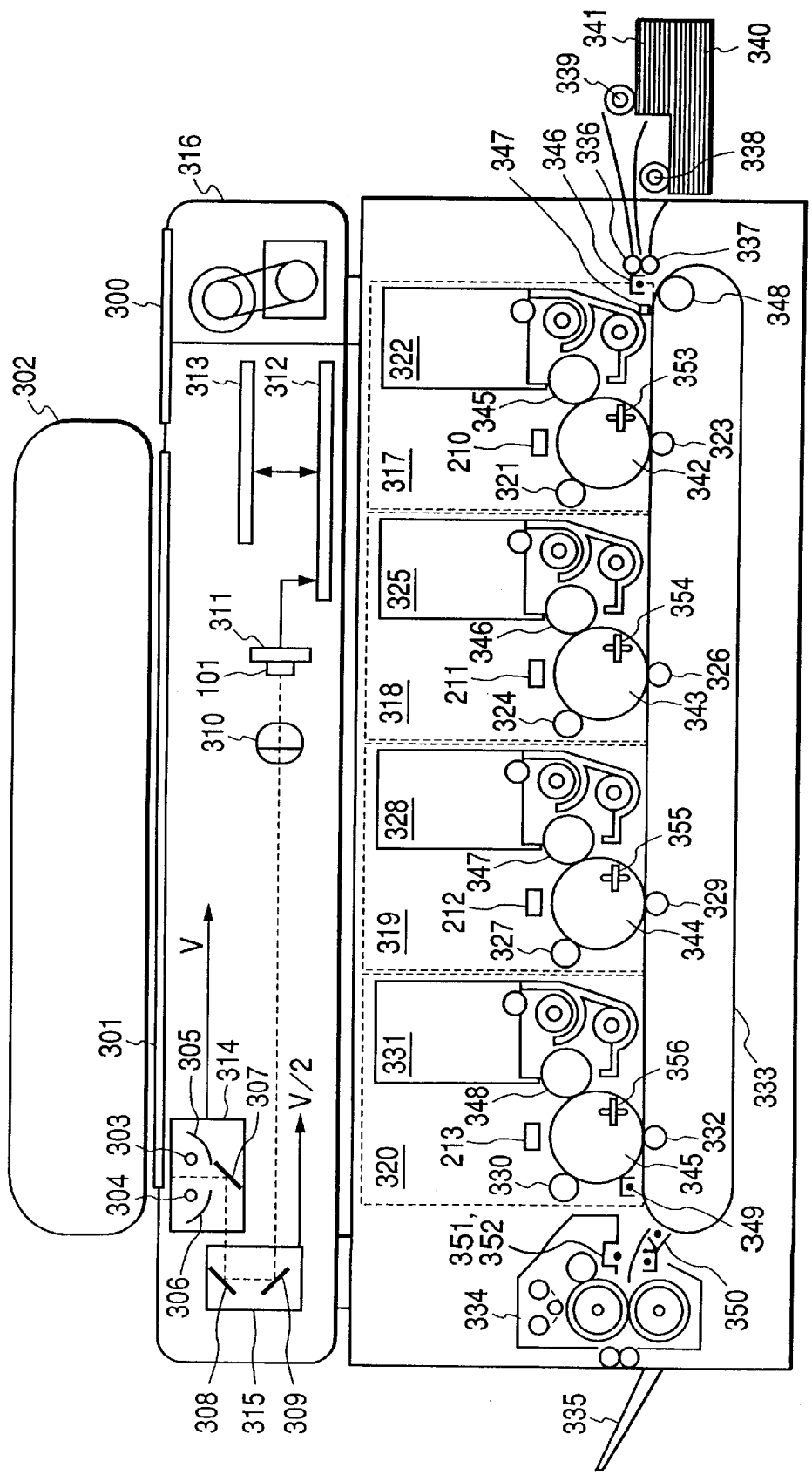
FIG. 2 is a sectional view showing an image forming apparatus used in the first to third embodiments.

FIG. 2 is a view showing the whole arrangement of a color image forming apparatus according to the first embodiment of the present invention. The color image forming apparatus will be described with reference to FIG. 2.

The arrangement of the reader section will be explained.

In FIG. 2, the reader section is constituted by a CCD 101, a substrate 311 on which the CCD 101 is mounted, a printer processor 312, a glass original table 301, an original feeder 302, light sources 303 and 304 for illuminating the original, reflectors 305 and 306 for condensing light from the light sources 303 and 304 and sending the light toward the original, mirrors 307 to 309, a lens 310 for condensing the reflected or projected light from the original on the CCD 101, a carriage 314 for storing the light sources 303 and 304, the reflectors 305 and 306, and the mirror 307, a carriage 315 for storing the mirrors 308 and 309, and an interface 313 with another component such as the CPU.

The entire surface of the original is scanned (subscanned) by mechanically moving the carriages 314 and 315 in the electrical scanning (main scanning) direction of the CCD 101 at speeds V and V/2, respectively.

The original on the glass original table reflects light from the light sources 303 and 304, and the reflected light is guided to the CCD 101 and converted into an electrical signal. The electrical signal (analog image signal) is input to the image processor 312 and converted into a digital signal. The converted digital signal is processed, transferred to the printer section, and used to form an image.

The arrangement of the printer section will be explained.

In FIG. 2, the printer section comprises an M (Magenta) image forming unit 317, a C (Cyan) image forming unit 318, a Y (Yellow) image forming unit 319, and a K (blacK) image forming unit 320. Since these units have the same arrangement, only the M image forming unit 317 will be explained, and a description of the remaining image forming units will be omitted.

In the M image forming unit 317, a latent image is formed on the surface of a photosensitive drum 342 by light from an LED array 210. A primary charger 321 charges the surface of the photosensitive drum 342 to a predetermined potential to prepare for formation of the latent image. A developing unit 322 develops the latent image on the photosensitive drum 342 to form a toner image. The developing unit 322 includes a sleeve 345 for applying a developing bias and developing the image. A transfer charger 323 discharges below a transfer member convey belt 333 and transfers the toner image on the photosensitive drum 342 to a recording paper sheet as a transfer member on the transfer member convey belt 333. In the first embodiment, a cleaner conventionally used is not arranged to obtain a high transfer efficiency, but it may be arranged.

The procedure of forming an image on, e.g., a recording paper sheet will be described. Recording paper sheets stacked in cassettes 340 and 341 are picked up one by one by pickup rollers 339 and 338 and supplied onto the transfer member convey belt 333 by paper feed rollers 336 and 337. The fed recording paper sheet is charged by an attraction charger 346.

A transfer member convey belt roller 348 drives the transfer member convey belt 333, charges the recording paper sheet together with the attraction charger 346, and attracts the recording paper sheet to the transfer member convey belt 333. The transfer member convey belt roller 348 may be arranged on the fixing unit side.

A leading end sensor 347 detects the leading end of the recording paper sheet on the transfer member convey belt 333. The detection signal of the leading end sensor is transferred from the printer section to the color reader section, and used as a subscanning sync signal in transferring a video signal from the color reader section to the printer section.

The recording paper sheet is conveyed by the transfer member convey belt 333, and toner images are formed on the sheet surface in the order from M, C, Y, and K in the image forming units 317 to 320. The recording paper sheet passing through the K image forming unit 320 is charge-removed by a charge remover 349 in order to facilitate separation from the transfer member convey belt 333, and then separated from the transfer member convey belt 333. A separation charger 350 prevents image disturbance by separation discharge in separating the recording paper sheet from the transfer member convey belt 333. The separated recording paper sheet is charged by pre-fixing chargers 351 and 352 in order to compensate for the toner adhesion strength and prevent image disturbance, and discharged to a discharge tray 335 after the toner image is thermally fixed by a fixing unit 334.

A known vibration type motor is used as a driving motor for rotating the photosensitive drums 342 to 345 in the image formation process units for respective colors, and the transfer member convey belt roller 348.

The vibration type motor is also called an ultrasonic motor. In this motor, an AC signal is applied to a piezoelectric element as an electro-mechanical energy conversion element fixed to, e.g., an annular elastic member to generate a vibration wave on the surface of the elastic member, and the moving member is brought into contact with the vibration wave to drive the moving member.

Figure 3:
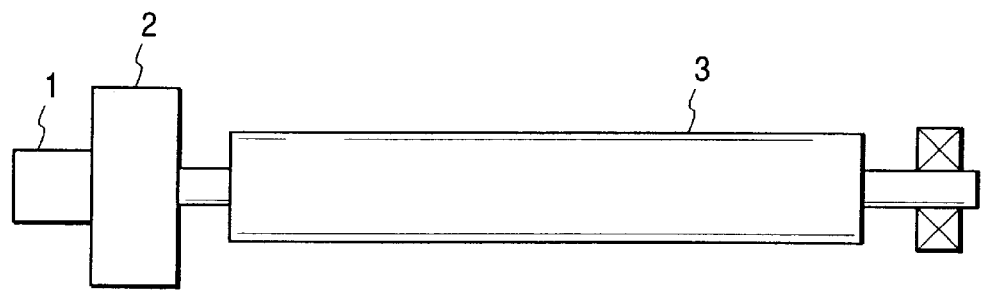
FIG. 3 is a view showing connection between a photosensitive drum and a vibration type motor in FIG. 2.

FIG. 3 is a schematic view showing connection between the photosensitive drum and the vibration type motor. In FIG. 3, a rotary encoder 1 outputs the rotational angle of the output shaft of a vibration type motor 2 as pulse information. As shown in FIG. 3, a photosensitive drum 3 is directly connected to the output shaft of the vibration type motor 2 without an intermediate power transfer unit such as a belt or gear, thereby realizing high-precision rotation.

Figure 4:
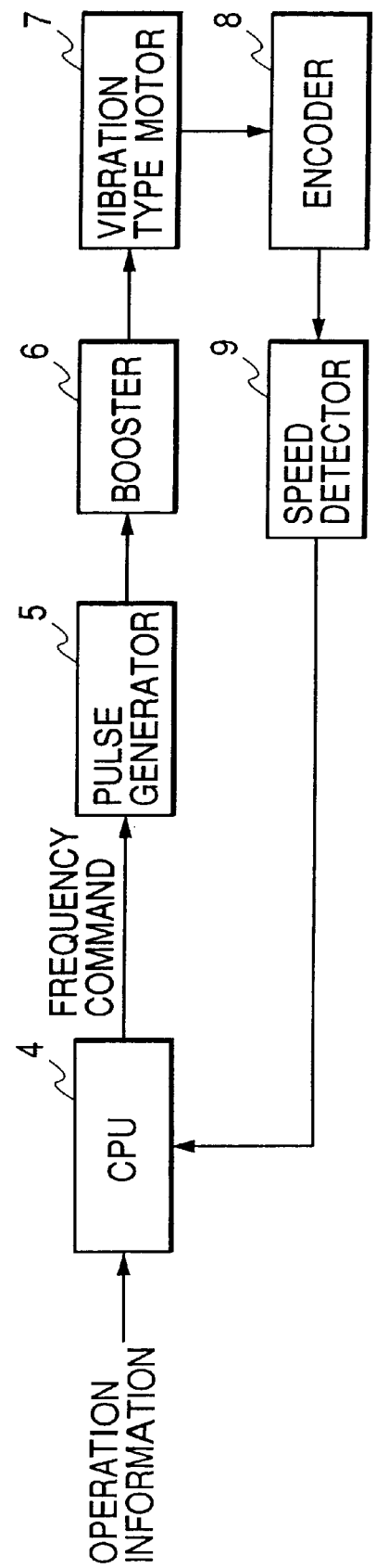
FIG. 4 is a block diagram showing the arrangement of a control system for the vibration type motor according to the first to third embodiments.

FIG. 4 is a block diagram showing the arrangement of a vibration type motor controller.

Referring to FIG. 4, a CPU 4 controls the speed of the vibration type motor and various operations of the image forming apparatus. FIG. 4 shows only control associated with the vibration type motor, and a description about other operations of the image forming apparatus will be omitted. The first embodiment adopts a total of five vibration type motors, i.e., four motors for driving the respective photosensitive drums in the four color image forming process units and one motor for driving the transfer member convey belt. Control for the motors is the same, and only the control system for one vibration type motor is illustrated. In practice, five blocks each associated with control of the vibration type motor in FIG. 4 except for the CPU 4 are used.

Figure 5:
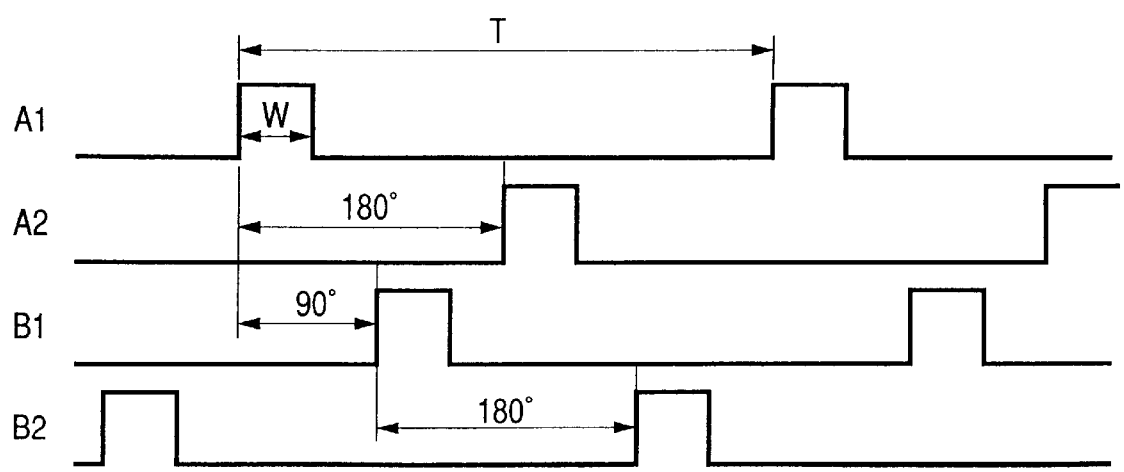
FIG. 5 is a timing chart showing a signal output from a pulse generator used in the first to third embodiments.

Referring to FIG. 4, a pulse generator 5 generates a signal for driving the vibration type motor. The pulse generator 5 generates four phase pulse signals like the ones shown in FIG. 5. In FIG. 5, T is the pulse period, which is the reciprocal of a frequency command input from the CPU. All the four phase signals output from the pulse generator 5 have the period T. In FIG. 5, W is the pulse width, which is set to such a value as to efficiently drive the vibration type motor.

If the pulse width W is too large, a boosting unit component (to be described later) is damaged. If the pulse width W is too small, a sufficient output of the vibration type motor cannot be obtained.

The vibration type motor used in the first embodiment is a so-called travelling wave type motor, which is driven by two phase AC signals having a phase difference of 90° or −90°. The two phase AC waves are referred to as an A-phase signal and a B-phase signal. Of the four phase signals in FIG. 5, signals A1 and A2 are used to generate the A-phase AC signal, and signals B1 and B2 are used to generate the B-phase signal. The signals A1 and A2 have a phase difference of 180°, and the signals B1 and B2 also have a phase difference of 180°.

The signal B1 has a phase delay of −90° or a phase advance of +90° with respect to the signal A1. Whether the phase difference advances or delays determines the rotating direction of the vibration type motor. FIG. 5 shows the case wherein the signal B1 has a phase difference of −90°.

Figure 6:
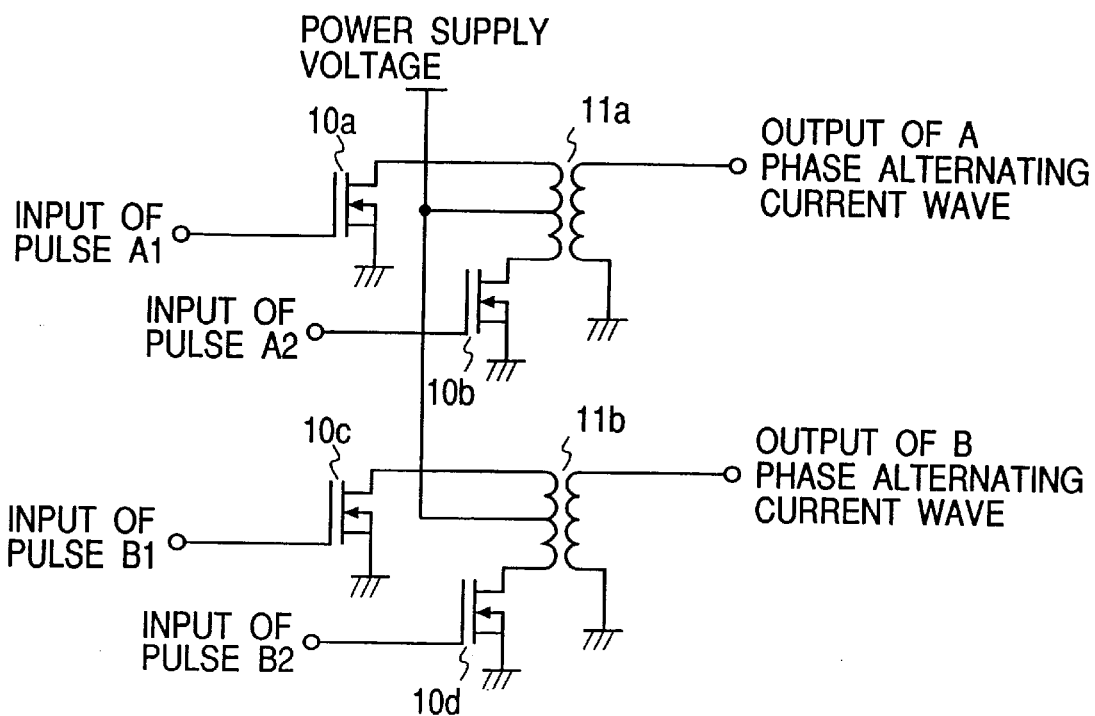
FIG. 6 is a circuit diagram showing a booster used in the first to third embodiments.
Figure 7:
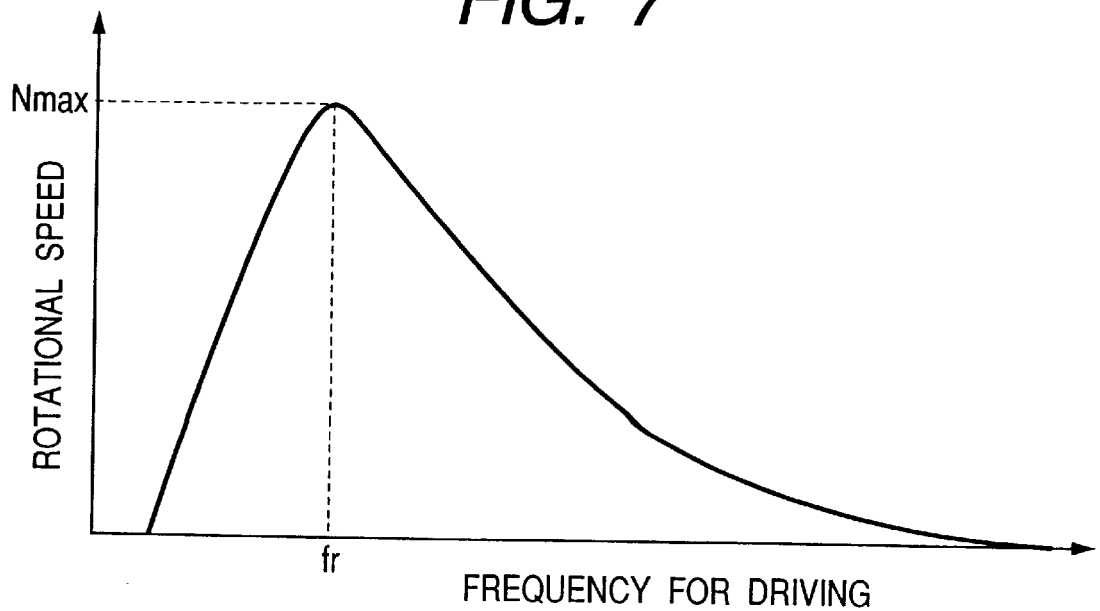
FIG. 7 is a graph showing the relationship between the frequency for driving and speed of the vibration type motor.

FIG. 6 is a circuit diagram showing the detailed arrangement of a booster 6 in FIG. 4. FIG. 6 shows only components necessary for explaining the function of the booster. Referring to FIG. 6, FETs 10a, 10b, 10c, and 10d are switching elements which are turned on when a high-level driving pulse is input from the pulse generator 5 in FIG. 4, and are turned off when a low-level pulse is input from the pulse generator 5. The switching operation controls the current flowing through the primary sides of transformers 11a and 11b with center taps. An AC voltage boosted in proportion to the winding ratio of the transformer is induced on the secondary sides of the transformers 11a and 11b. One terminal of the secondary side of each transformer is grounded, and the other terminal is connected to a vibration type motor 7 for the A- or B-phase signal.

Referring to FIG. 4, an encoder 8 detects the rotational state of the vibration type motor 7 optically or magnetically, and outputs a binary signal in accordance with the rotational position. As the rotational speed of a component connected to the encoder 8 is higher, the frequency of the pulse output from the encoder is higher.

Referring to FIG. 4, a speed detector 9 measures the frequency of the pulse output from the encoder 8 and outputs it as data of a plurality of bits to the CPU.

Figure 11:
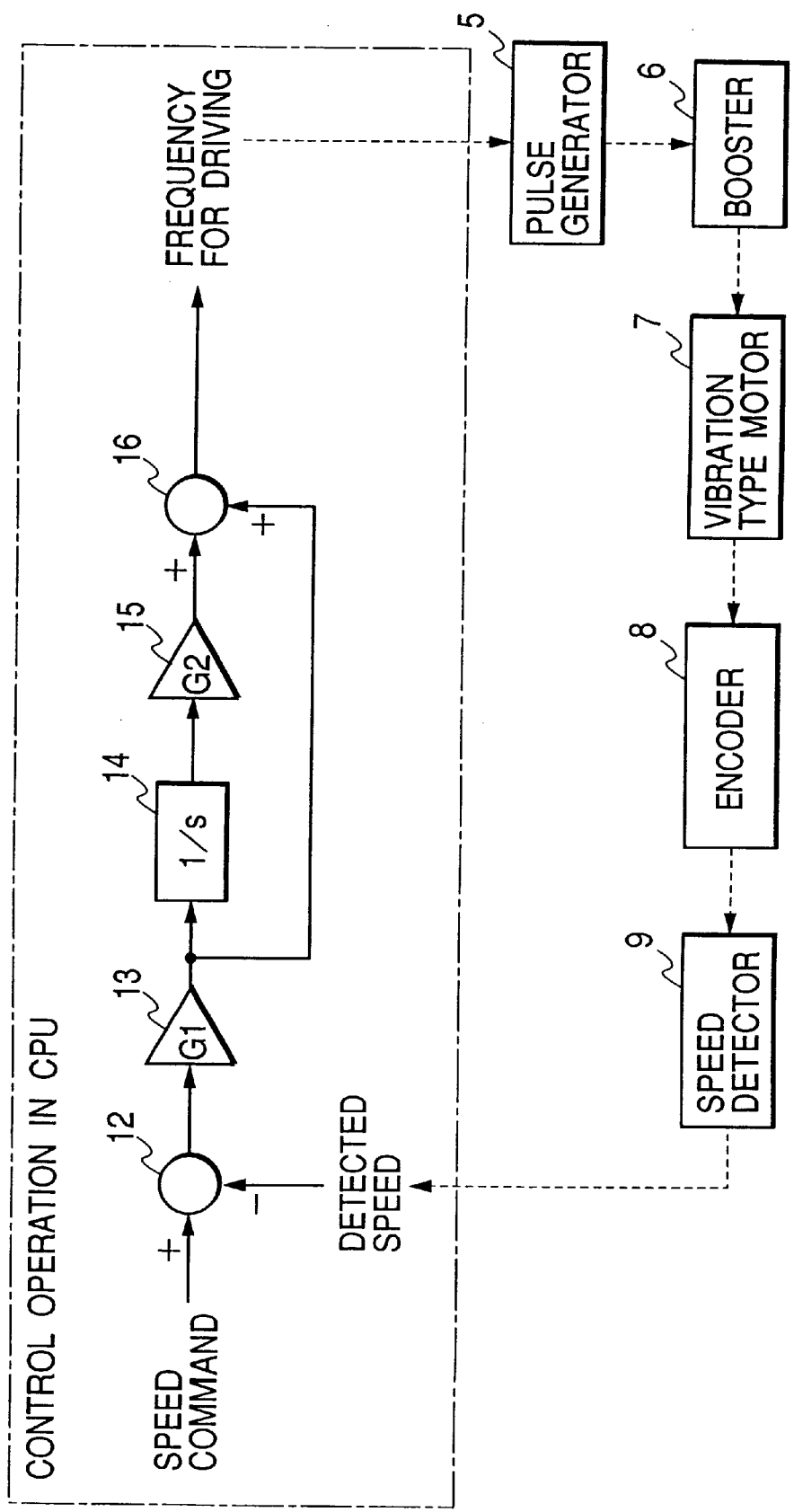
FIG. 11 is a control block diagram for explaining control contents by the CPU used in the first to third embodiments.

FIG. 11 is a block diagram showing a vibration type motor speed control method by the CPU 4. Referring to FIG. 11, the section surrounded by the chain line is associated with control operation in the CPU 4. The elements described in FIG. 4 are also illustrated for explaining feedback. In the first embodiment, proportional plus integral control is performed for the speed. The control method will be described with reference to FIG. 11.

The speed command in FIG. 11 is a value programmed in the CPU 4 in advance or given externally. For example, this value increases stepwise at the start from a low speed to a speed necessary for image formation of the image forming apparatus at a given time interval.

During image formation, a predetermined value is given as a speed command. To stop image formation, the value decreases stepwise from the image formation speed to a low speed at a given time interval.

Referring to FIG. 11, a subtraction block 12 calculates the difference between the command speed and a speed detected by the speed detector. Under normal control, subtraction is "(command value)–(detected value)". However, since the frequency vs. speed curve of the vibration type actuator has a negative gradient, subtraction is "(detected value)–(command value)". A first multiplier 13 multiplies a control gain G1 by input data. An output from the first multiplier 13 is divided into two. One output is integrated by an integral block 14 and multiplied by a gain G2 in a second multiplier 15. In the integral block 14, an initial frequency is set as an initial value to stop the vibration type motor.

An adder 16 adds the integral and proportional terms and sends the sum as a frequency for driving to the pulse generator 5.

The operation of the vibration type motor 7 is controlled by the above arrangement.

Figure 8A:
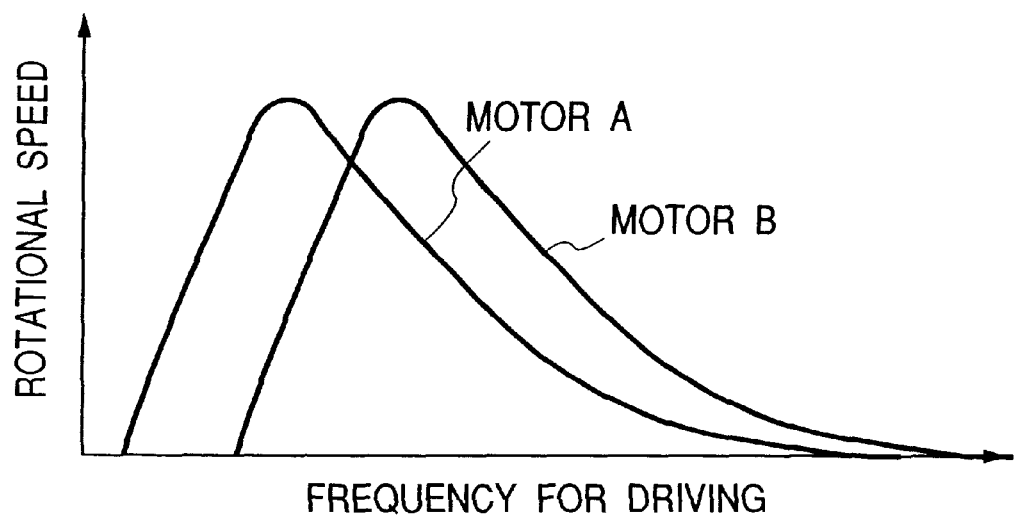
FIGS. 8A and 8B are graphs for explaining variations between vibration type motors.
Figure 8B:
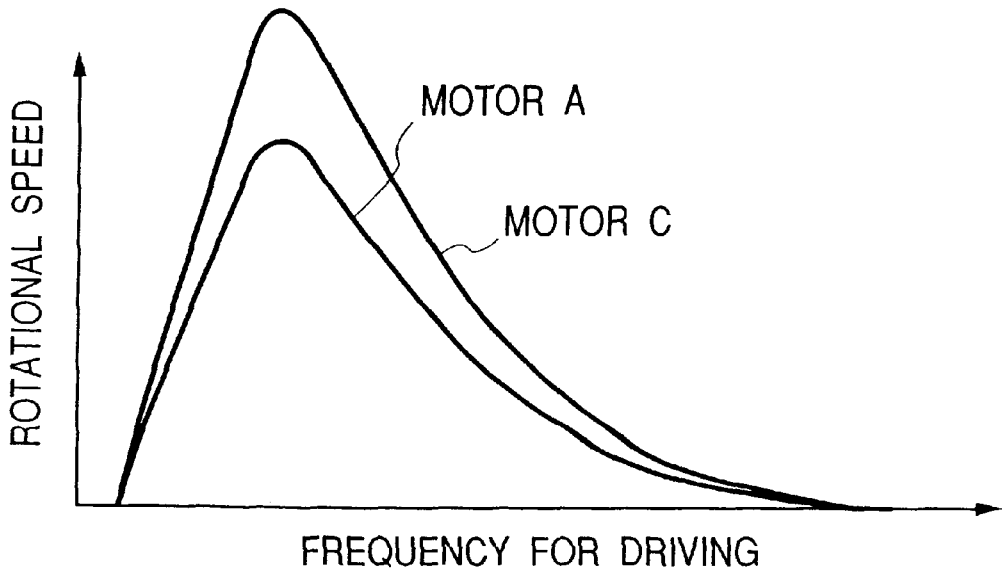

When the frequency (initial frequency) output at start is always constant, the time the speed takes to reach the speed command value varies due to the presence of an individual difference as shown in FIGS. 8A and 8B, and the photosensitive drum is damaged. To avoid this, the motor characteristics are detected in advance. This requires a detection means for synchronizing the operations of a plurality of motors and preventing the photosensitive drum from being damaged even during detection.

Figure 1:
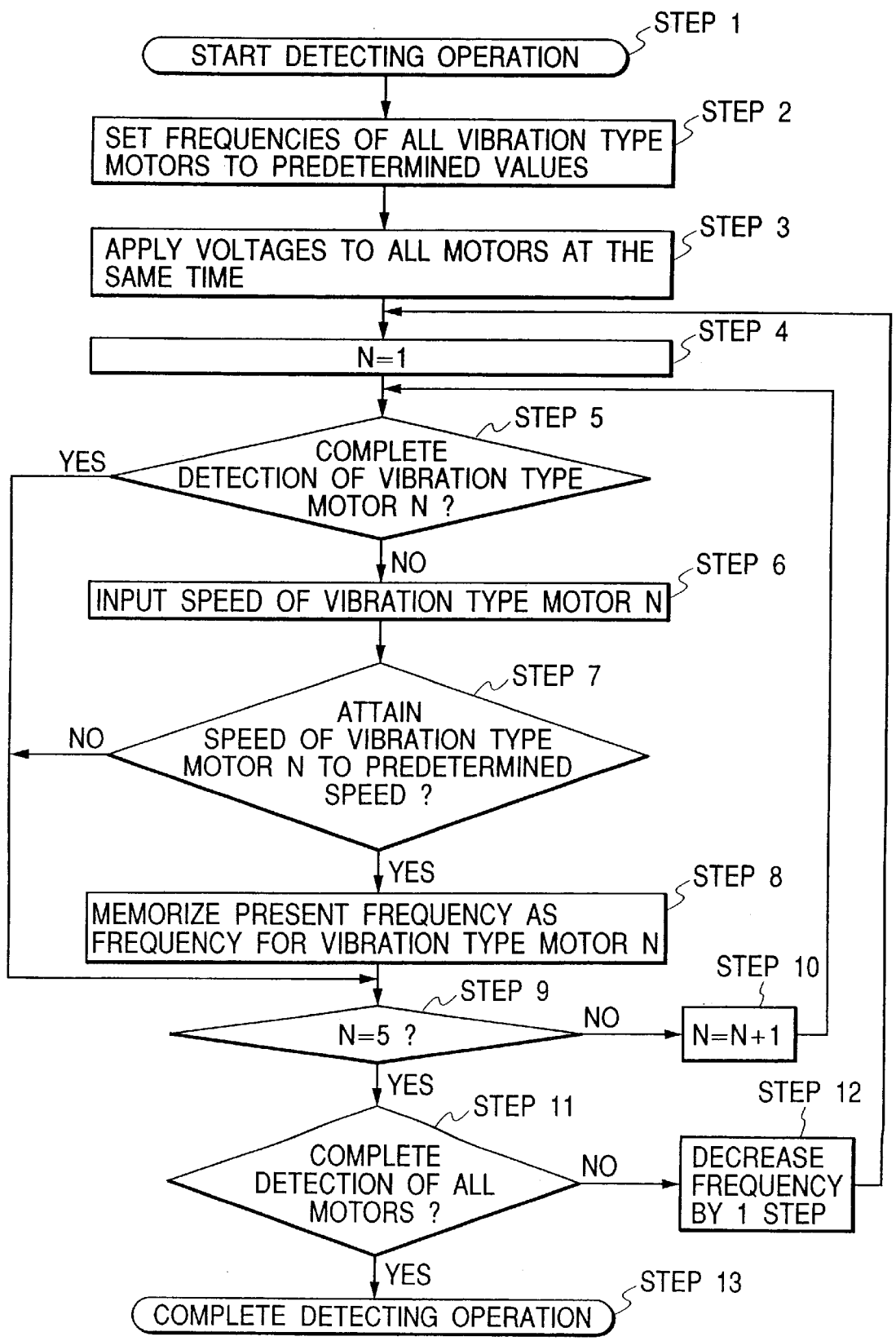
FIG. 1 is a flow chart showing operation according to the first embodiment of the present invention.

FIG. 1 is a flow chart showing detection by the CPU 4 in FIG. 4. The first embodiment adopts four vibration type motors for driving the Y, M, C, and K drums and one vibration type motor for driving the transfer member convey belt. For descriptive convenience, the vibration type motors for driving the drums are referred to as vibration type motors 1 to 4, and the vibration type motor for driving the transfer member convey belt is referred to as a vibration type motor 5. The detecting operation according to the first embodiment of the present invention will be described in detail with reference to FIG. 1.

When the need for detecting operation for the vibration type motor is determined due to, e.g., shipment of the image forming apparatus from the factory, application of the power supply voltage, or the use time expiration or repeated use of the image forming apparatus, the detecting operation in STEP 1 starts.

In STEP 2, the frequencies of the four drum driving vibration type motors and one transfer member convey belt driving vibration type motor are set to predetermined values. In the detecting operation (to be described below), since the driving frequency of the vibration type motor is swept from the high frequency side to the low frequency side, the predetermined frequencies set in STEP 2 are frequencies for rotating the vibration type motors at relatively low speeds (or may be set to high frequencies which cannot rotate the vibration type motors). At this time, no voltage is applied to the vibration type motors.

In STEP 3, driving AC voltages are applied to all the vibration type motors at the same time.

In STEP 4, "1" is set in an internal memory N of the CPU 4. The memory N indicates the number of a motor to be measured and detected in order to sequentially measure and detect vibration type motors 1 to 5.

In STEP 5, whether the detecting operation for vibration type motor N is complete (whether YES in step 7) is checked. If YES in STEP 5, the flow advances to STEP 9; or if NO, to STEP 6. This is because one detecting operation suffices for each motor, and the detecting operation is prevented from being performed again for motors that have been detected.

In STEP 6, the present driving speed of vibration type motor N is input from the speed detector 9 in FIG. 4.

In STEP 7, whether the speed input in STEP 6 has attained a predetermined speed (or whether rotation starts) is checked. As the predetermined value, a relatively low-speed value is selected. If YES in STEP 7, the flow advances to STEP 8; or if NO, to STEP 9.

In STEP 8, the present frequency is memorized as the frequency for vibration type motor N. This frequency is called an initial frequency, which is first applied to the vibration type motor at the start of operation of the image forming apparatus. After application of the initial frequency, the CPU 4 in FIG. 4 continues to control the frequency based on information from the speed detector 9.

In STEP 9, whether the number of the motor being detected is the final number "5" is checked. If NO in STEP 9, the flow advances to STEP 10; or if YES, to STEP 11.

In STEP 10, the contents of the memory N are added to increment the motor number to indicate the next motor. Then, the flow advances to STEP 5 to repeat the above operation.

In STEP 11, since the motor number is the final number "5", whether all the motors have been detected (whether STEP 8 has been performed for all the motors) is checked. If NO in STEP 11, the frequency is decreased by one step in STEP 12 to make the driving frequency closer to the resonance frequency. The flow advances to STEP 4 to return the motor number to "1" and repeats the above detecting operation.

One step herein means the resolution in determining the initial frequency. As one step is smaller, the initial frequency can be determined with a finer resolution. If YES in STEP 11, the flow advances to STEP 13 to complete the detecting operation.

The convey belt retreats from the photosensitive drum, e.g., downward during this detecting operation.

By the detecting operation according to the above method, all the vibration type motors can be simultaneously detected, and the photosensitive drum can be prevented from being damaged by friction at the contact portion between the photosensitive drum and the transfer member convey belt.

In the first embodiment, such detecting operation as to make the rotational speeds of the drum driving vibration type motor and transfer member convey belt driving vibration type motor almost equal to each other is performed under the assumption that the diameter of the photosensitive drum is equal to the diameter of the roller (strictly speaking, the convey belt) on the shaft of the transfer member convey belt driving vibration type motor. If their diameters are different, the frequency at the start of detection and the speed in memorizing the frequency must be set in consideration of the diameters. In other words, the peripheral speed of the convey belt suffices to be equal to the peripheral speed of the photosensitive drum.

By the above processing, the driving frequencies of the five motors with respect to the predetermined speed are memorized. At the start of copying, the memorized frequencies are used to rotate all the photosensitive drums and convey belt at the predetermined speeds (peripheral speeds).

More specifically, the initial frequencies set at the start of driving the respective motors in copying (main operation) after the above detecting operation of the motors are set to frequencies detected by the detecting operation or frequencies based on the detected frequencies. The frequencies of the respective motors gradually decrease from the initial values to drive the motors.

Second Embodiment

In the first embodiment, when the frequency vs. speed characteristics of the vibration type actuator greatly vary, even if detecting operation is simultaneously performed, friction between the photosensitive drum and the transfer member convey belt may pose problems.

In the second embodiment of the present invention, even when the characteristics greatly vary, friction between the photosensitive drum and the transfer member convey belt is suppressed.

Figure 9:
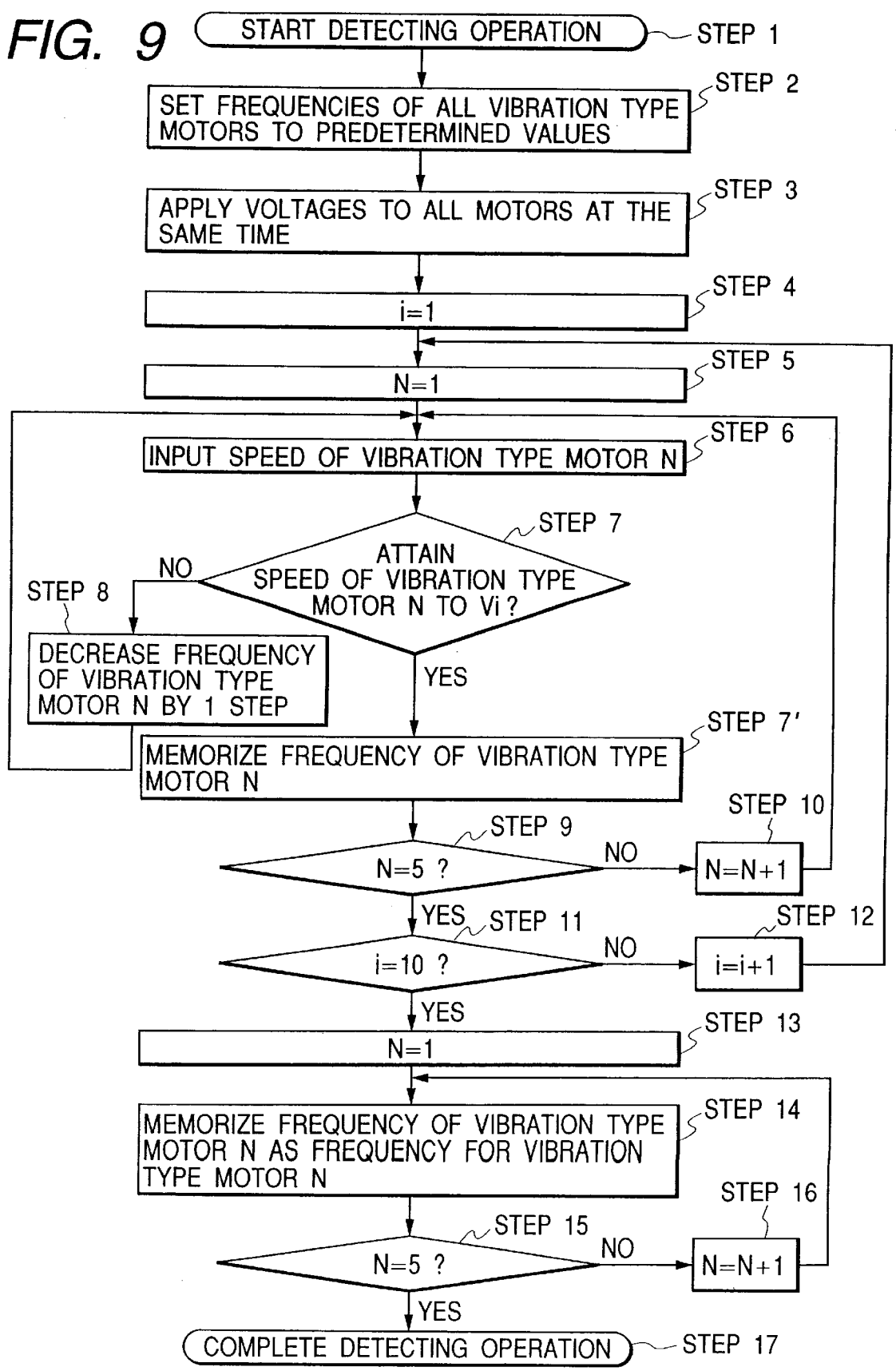
FIG. 9 is a flow chart showing operation according to the second embodiment.

FIG. 9 is a flow chart showing detecting operation according to the second embodiment of the present invention.

The second embodiment also concerns an image forming apparatus similarly to the first embodiment, and its controller has the same arrangement. In the second embodiment, therefore, only the detecting operation by the CPU 4 which is different from the first embodiment will be described in detail.

Referring to FIG. 9, when the need for the detecting operation for the vibration type actuator is determined due to, e.g., shipment of the image forming apparatus from the factory, application of the power supply voltage, or the use time expiration or repeated use of the image forming apparatus, the detecting operation in STEP 1 starts.

In STEP 2, similar to STEP 2 in the first embodiment, the frequencies of four drum driving vibration type motors and one transfer member convey belt driving vibration type motor are set to predetermined values.

In STEP 3, driving AC voltages are applied to all the vibration type motors at the same time.

In STEP 4, an internal memory i of the CPU in FIG. 4 is set. The memory i indicates the number of a speed table used in the detecting operation of the second embodiment.

As shown in FIG. 10, the speed table is formed to smoothly increase the speed from a relatively low speed V1 to a predetermined speed V10. In the second embodiment, the table covers the speed range of 0.03 1/sec to 0.3 1/sec. The rotational speed of the photosensitive drum in image formation of the image forming apparatus is 1.2 1/sec. Note that "1/sec" is the unit of the rotational speed representing the number of turns per second.

In STEP 5, "1" is set in an internal memory N of the CPU 4. The memory N indicates the number of a motor to be measured and detected.

In STEP 6, the speed of vibration type motor N is input from the speed detector 9 in FIG. 4.

In STEP 7, whether the speed data read in STEP 6 has attained Vi in the speed table is checked (at this time, the frequency of motor N is memorized in STEP 7'). If YES in STEP 7, the flow advances to STEP 9; or if NO, to STEP 8 to decrease the present frequency of vibration type motor N by one step (while keeping the frequencies of the remaining motors unchanged). The flow advances to STEP 6 again to repeat the above operation. As a result, the rotational speed of vibration type motor N attains Vi.

In STEP 9, whether the present motor number is "5" is checked. If YES in STEP 9, the flow advances to STEP 11. If NO in STEP 9, the flow advances to STEP 10 to increment the motor number, and it advances to STEP 6. Accordingly, the frequency of each motor when the speed attains Vi is memorized.

In STEP 11, the speeds of all the motors have attained Vi. In STEP 11, whether the speed table number i is the final number "10" is checked. If YES in STEP 11, the flow advances to STEP 13. If NO in STEP 11, the flow advances to STEP 12 to increment the table number i, and it advances to STEP 5. By this processing, the frequency of each motor when the speed attains V1 to V10 is memorized for each of the speeds V1 to V10.

In STEP 13, since all the motors have attained V10, the frequency of each motor at this time (frequency for each table number i) is memorized. The motor number N is set to "1" in STEP 13, and the frequency of motor 1 is memorized in STEP 14. In STEP 15, whether the motor number N is "5" is checked. If NO in STEP 15, the motor number N is incremented in STEP 16, and the flow advances to STEP 14. When the frequencies of all the motors are memorized, the flow advances to STEP 17 to complete the detecting operation. The memorized frequencies are used as initial frequencies, similarly to the first embodiment.

By the above method, the detecting operation is simultaneously performed for all the vibration type motors. Since the speed of each vibration type motor is adjusted in accordance with the speed table in changing the frequency, any speed difference between the respective motors can be suppressed, compared to the first embodiment. The photosensitive member can be prevented from being damaged by friction at the contact portion between the drum driving vibration type motor and the transfer member convey belt driving vibration type motor.

More specifically, in copying (main operation) upon completion of detecting operation, the initial frequency set at the start of operating each motor is set to a frequency for the table number i=1. The frequency is sequentially shifted from this value in the order from the table number=2, 3, 4, thereby adjusting the speeds of the respective motors.

In the second embodiment, all the frequencies for the speeds V1 to V10 are memorized. However, the present invention is not limited to this, and a frequency for at least one arbitrary speed may be memorized.

In the second embodiment, the same speed table is used for both the drum driving vibration type motor and the transfer member convey belt driving vibration type motor under the assumption that the diameter of the drum is equal to the diameter of the roller on the shaft of the transfer member convey belt driving vibration type motor. If their diameters are different, the speed table for the drum driving vibration type motor and the speed table for the transfer member convey belt driving vibration type motor must be separately set. In addition, the second embodiment exemplifies the method of memorizing the frequency vs. speed characteristic. When the speed is controlled by the pulse widths of A1, A2, B1, and B2 in the circuit of FIG. 6, the pulse width vs. speed characteristic is memorized.

Third Embodiment

In the first and second embodiments described above, the detected frequency is used as an initial frequency for the operation of the image forming apparatus. As shown in FIG. 8B, when the gradient of the driving frequency vs. speed curve varies due to variations in vibration type motors, if the speed is controlled by adjusting the frequency with the same control gain, the speed may vary and control may oscillate because of a different open-loop transfer function of the feedback loop.

As a result, the image quality may degrade, and the surface of the photosensitive member may be damaged. To prevent this, the transfer function of the feedback loop must be adjusted in accordance with the characteristics of the motor. More specifically, a gain G1 of an amplifier 13 in FIG. 11 is adjusted. In the third embodiment of the present invention, such a gain as to make transfer functions equal under control of a plurality of vibration type motors is calculated.

Figure 12B:
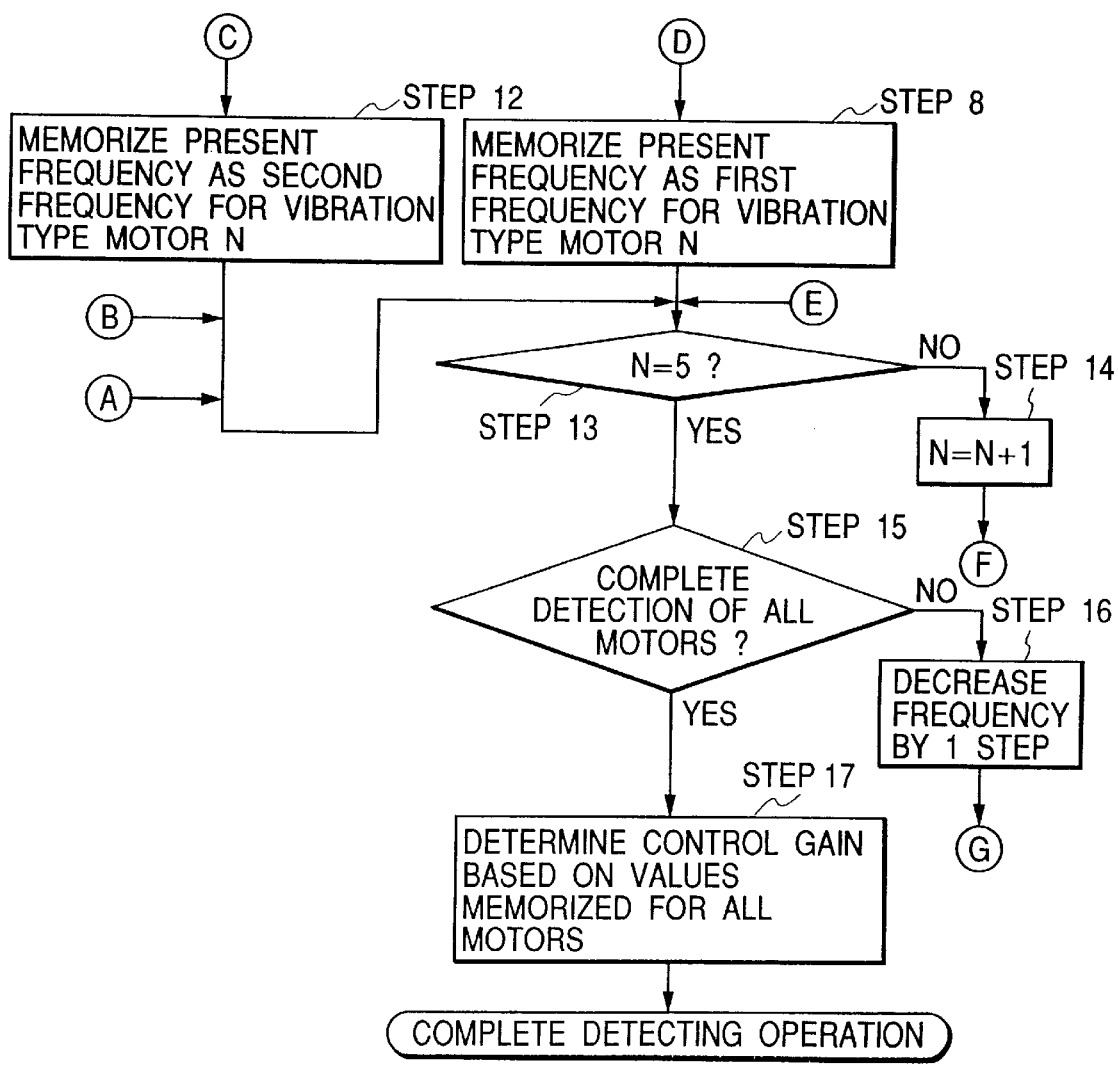
FIG. 12 which is composed of FIGS. 12A and 12B are flow charts showing operation according to the third embodiment.

FIGS. 12A and 12B are flow charts showing detecting operation according to the third embodiment of the present invention. The detecting operation in the third embodiment will be described with reference to FIGS. 12A and 12B. The arrangement of the image forming apparatus is the same as in the first and second embodiments, and a description thereof will be omitted.

Referring to FIGS. 12A and 12B, when the need for a detecting operation for the vibration type actuator is determined due to, e.g., shipment of the image forming apparatus from the factory, application of the power supply voltage, or the use time expiration or repeated use of the image forming apparatus, the detecting operation in STEP 1 starts.

In STEP 2, the frequencies of all vibration type motors are set to predetermined values.

In STEP 3, voltages are applied to four drum driving vibration type motors and one transfer member convey belt driving vibration type motor at the same time.

In STEP 4, "1" is set in a memory N like the one in the first embodiment.

In STEP 5, whether the first detection for vibration type motor N is complete is checked. In the third embodiment, to calculate the gradient of the speed vs. frequency curve of the vibration type motor, frequencies corresponding to a relatively low, first speed and a relatively high, second speed are obtained, and the range between the two frequencies is linearly approximated. In STEP 5, whether detection of the first speed is complete (whether YES in STEP 7) is checked. If NO in STEP 5, the flow advances to STEP 6; or if YES, to STEP 9.

In STEP 6, the speed of vibration type motor N is input from the speed detector 9 in FIG. 4.

In STEP 7, whether vibration type motor N has attained the predetermined speed, i.e., first lower speed is checked. If YES in STEP 7, the flow advances to STEP 8 to memorize the present frequency as a first frequency for vibration type motor N. If NO in STEP 7, the flow advances to STEP 13.

The second detection in STEPs 9 to 12 is the same as the first detection in STEPs 5 to 8 except for the predetermined speed, and a description thereof will be omitted.

In STEP 13, whether the number N of a motor being detected is the final number "5" is checked. If NO in STEP 13, the motor number is incremented by one in STEP 14, and the flow advances to STEP 5. If YES in STEP 13, the flow advances to STEP 15.

In STEP 15, whether the first detection and the second detection are complete for all the motors is checked. If NO in STEP 15, the present frequency is decreased by one step in STEP 16, and the flow advances to STEP 4. If YES in STEP 15, the flow advances to STEP 17.

In STEP 17, the gradient of the speed. vs. frequency curve is calculated for all the motors on the basis of information obtained by the first detection and the second detection. The obtained gradient is multiplied by a proportionality constant corresponding to the control loop, thereby determining the control gain G1 of the amplifier shown in FIG. 11 for each motor. Letting Va be the first speed, Vb be the second speed, fa be the first frequency, fb be the second frequency, and K be the proportional constant, the control gain G1 is given by $$G1=\{(Vb-Va)/(fb-fa)\} \times K$$

By the detecting operation according to the above-described method, the difference in open-loop transfer characteristics owing to the individual difference between vibration type motors can be reduced. Since detecting operation is simultaneously performed for all the vibration type motors, any speed difference between the respective motors can be suppressed. The photosensitive member can be prevented from being damaged by friction at the contact portion between the drum driving vibration type motor and the transfer member convey belt driving vibration type motor.

In copying (main operation), the motor is driven after the gain G1 calculated for each motor is set in it.

In the third embodiment, similar to the first embodiment, the frequency of the AC voltage applied to all the vibration type motors is decreased by one step. Like the second embodiment, the speed may be detected while the frequency is adjusted to make the speeds of the respective motors almost equal to each other.

In the first to third embodiments, detecting operation is performed in accordance with the program in the CPU, but may be performed by another method such as a digital circuit or DSP.

In the third embodiment, since the speed of the vibration type motor, as a driver for the image forming apparatus, is controlled by controlling the frequency, the detecting operation obtains the control gain from the gradient of the speed vs. frequency curve. When the speed of the vibration type motor is controlled by the amplitude of the driving voltage, the above detecting operation must obtain the gradient of the speed vs. driving voltage amplitude curve (pulse width in FIG. 6). In this case, the voltage replaces the frequency in FIGS. 12A and 12B.

The first to third embodiments according to the present invention have exemplified vibration type motors having relatively large characteristic variations. In an apparatus using a plurality of electromagnetic motors or an apparatus using an electromagnetic motor in combination with a vibration type motor, if a plurality of motors must be rotated in synchronism with each other, and characteristic variations between electromagnetic motors may pose problems, the speed vs. current characteristic of the electromagnetic motor can also be detected by the method described in the first to third embodiments.

In each embodiment, when the need for detecting operation for the vibration type actuator is determined due to, e.g., shipment of the image forming apparatus from the factory, application of the power supply voltage, or the use time expiration or repeated use of the image forming apparatus, the detecting operation starts. At this time, the detecting time can be shortened by using previously detected data in next detection, e.g., the previous frequency, voltage, or current value required to attain a predetermined speed upon activation.

What is claimed is:

1. A driving apparatus for controlling speeds of a plurality of vibration type motors, comprising:
    a detecting unit for applying a cyclic signal to each motor and detecting an output characteristic of the motor; and
    a control unit for adjusting the cyclic signal applied to each motor and controlling a speed of the motor on the basis of the output characteristic of the motor detected by said detecting unit.

2. An apparatus according to claim 1, wherein said control unit controls the cyclic signal on the basis of the detected output characteristic so as to make speeds of objects driven by the motors substantially equal to each other.

3. An apparatus according to claim 2, wherein the plurality of motors are simultaneously driven.

4. An apparatus according to claim 1, wherein said detecting unit detects for each motor a value of a cyclic signal exhibiting a predetermined output characteristic defined in advance for the motor.

5. An apparatus according to claim 4, wherein the value of the cyclic signal detected by said detecting unit is a value of a cyclic signal at which the objects driven by the motors exhibit substantially the same speed.

6. An apparatus according to claim 5, wherein the value of the cyclic signal detected by said detecting unit is for each motor a value of a cyclic signal at which the objects driven by the motors exhibit substantially the same speed, and said detecting unit detects values of the cyclic signal for different speeds, at which the objects driven by the motors exhibit substantially the same speed.

7. An apparatus according to claim 6, wherein said control unit sets the value of the cyclic signal, as a value of a cyclic signal for the motor at which the objects exhibit the same speed when the motors are simultaneously driven.

8. An apparatus according to claim 4, wherein the value of the cyclic signal is a frequency.

9. An apparatus according to claim 4, wherein the value of the cyclic signal is a value for determining a vibration amplitude.

10. An apparatus according to claim 1, wherein said detecting unit detects a frequency corresponding to an initial frequency at which each motor starts driving, and said control unit sets a frequency corresponding to the initial frequency detected for each motor, as an initial frequency of the cyclic signal at start of the motor when the motors are simultaneously driven.

11. An apparatus according to claim 1, wherein said detecting unit comprises a gain circuit for adjusting a gain for each motor used to drive the motor on the basis of the detected output characteristic.

12. A driving apparatus which has at least first and second vibration type motors and drives moving members with the motors, comprising:
    a memory unit for memorizing first driving data corresponding to speeds for changing a speed of the moving member driven by the first motor to a plurality of different speeds including first and second speeds, and second driving data corresponding to speeds for changing a speed of the moving member driven by the second motor to a plurality of different speeds including the first and second speeds; and
    a driving unit for controlling a driving signal with the first driving data in driving the first motor, and controlling the driving signal with the second driving data in driving the second motor.

13. An apparatus according to claim 12, wherein said driving unit simultaneously drives the first and second motors at the same speed using the first and second driving data.

14. A driving apparatus which has at least first and second vibration type motors and drives moving members with the motors, comprising:
    a driving circuit for driving the motors; and
    an adjustment unit for adjusting driving gains of the first and second motors by said driving circuit on the basis of driving characteristics of the first and second motors.

15. A driving apparatus according to claim 14, wherein the gains are adjusted to drive the moving members driven by the motors at the same speed when the first and second motors are simultaneously driven.

16. A driving apparatus for controlling speeds of a plurality of vibration type motors, comprising:
    a memory unit for memorizing cyclic signal vs. speed characteristic data for each motor; and
    a setting unit for setting the cyclic signal on the basis of data about each motor memorized in said memory unit so as to make speeds of moving members driven by the motors substantially equal to each other when the motors are simultaneously driven.

17. An apparatus according to claim 16, wherein said memory unit memorizes cyclic signals corresponding to different speeds for each motor.

18. A driving apparatus for controlling speeds of a plurality of vibration type motors, comprising:
    a driving circuit for each motor; and
    a setting unit for setting a driving gain for each motor in the driving circuit of the motor on the basis of an output characteristic of the motor.

19. An apparatus according to claim 18, wherein said setting unit sets the driving gain for each motor on the basis of first data about a driving signal when each motor exhibits a first output characteristic, and second data about a driving signal when the motor exhibits a second output characteristic.

20. An image forming apparatus for driving moving members with a plurality of vibration type motors and forming an image, comprising:
    a detecting unit for applying a cyclic signal to each motor and detecting an output characteristic of the motor; and
    a control unit for adjusting the cyclic signal applied to each motor and controlling a speed of the motor on the basis of the output characteristic of the motor detected by said detecting unit.

21. An apparatus according to claim 20, wherein said control unit controls the cyclic signal on the basis of the detected output characteristic so as to make speeds of moving members driven by the motors substantially equal to each other.

22. An apparatus according to claim 21, wherein the plurality of motors are simultaneously driven.

23. An apparatus according to claim 21, wherein a value of a cyclic signal detected by said detecting unit is a value of a cyclic signal at which the moving members driven by the motors exhibit substantially the same speed.

24. An apparatus according to claim 23, wherein the value of the cyclic signal detected by said detecting unit is for each motor a value of a cyclic signal at which the moving members driven by the motors exhibit substantially the same speed, and said detecting unit detects the values of the cyclic signal for different speeds, at which the moving members driven by the motors exhibit substantially the same speed.

25. An apparatus according to claim 20, wherein said detecting unit detects a frequency corresponding to an initial frequency at which each motor starts driving, and said control unit sets a frequency corresponding to the initial frequency detected for each motor, as an initial frequency of the cyclic signal at start of the motor when the motors are simultaneously driven.

26. An apparatus according to claim 20, wherein said detecting unit comprises a gain circuit for adjusting a gain for each motor used to drive the motor on the basis of the detected output characteristic.

27. An image forming apparatus having a driving apparatus which has at least first and second vibration type motors and drives moving members with the motors, comprising:
a memory unit for memorizing first driving data corresponding to speeds for changing a speed of the moving member driven by the first motor to a plurality of different speeds including first and second speeds, and second driving data corresponding to speeds for changing a speed of the moving member driven by the second motor to a plurality of different speeds including the first and second speeds; and
a driving unit for controlling a driving signal with the first driving data in driving the first motor, and controlling the driving signal with the second driving data in driving the second motor.

28. An apparatus according to claim 27, wherein said driving unit simultaneously drives the first and second motors at the same speed using the first and second driving data.

29. An image forming apparatus having a driving apparatus which has at least first and second vibration type motors and drives moving members with the motors, comprising:
a driving circuit for driving the motors; and
an adjustment unit for adjusting driving gains of the first and second motors by said driving circuit on the basis of driving characteristics of the first and second motors.

30. An apparatus according to claim 29, wherein the gains are adjusted to drive the moving members driven by the motors at the same speed when the first and second motors are simultaneously driven.

31. An image forming apparatus having a driving apparatus for controlling speeds of a plurality of vibration type motors, comprising:
a memory unit for memorizing cyclic signal vs. speed characteristic data for each motor; and
a setting unit for setting the cyclic signal on the basis of data about each motor memorized in said memory unit so as to make speeds of moving members driven by the motors substantially equal to each other when the motors are simultaneously driven.

32. An apparatus according to claim 31, wherein said memory unit memorizes cyclic signals corresponding to different speeds for each motor.

33. An image forming apparatus having a driving apparatus for controlling speeds of a plurality of vibration type motors, comprising:
a driving circuit for each motor; and
a setting unit for setting a driving gain for each motor in the driving circuit of the motor on the basis of an output characteristic of the motor.

34. An apparatus according to claim 33, wherein said setting unit sets the driving gain for each motor on the basis of first data about a driving signal when each motor exhibits a first output characteristic, and second data about a driving signal when the motor exhibits a second output characteristic.

* * * * *

UNITED STATES PATENT AND TRADEMARK OFFICE
CERTIFICATE OF CORRECTION

PATENT NO. : 6,084,334
DATED : July 4, 2000
INVENTOR(S) : SHINJI YAMAMOTO, ET AL.

It is certified that error appears in the above-identified patent and that said Letters Patent is hereby corrected as shown below:

At [54] Title

"PLURALITY" should read --A PLURALITY--.

Column 1

Line 2, "PLURALITY" should read --A PLURALITY--.

Column 5

Line 4, "(black)" should read --(Black)--.

Column 13

Line 11, "in" should read -in the--.

Signed and Sealed this

Seventeenth Day of April, 2001

Attest:

NICHOLAS P. GODICI

*Attesting Officer*      *Acting Director of the United States Patent and Trademark Office*